(12) United States Patent
Guo et al.

(10) Patent No.: US 12,374,140 B2
(45) Date of Patent: Jul. 29, 2025

(54) VISION PROCESSING AND MODEL TRAINING METHOD, DEVICE, STORAGE MEDIUM AND PROGRAM PRODUCT

(71) Applicant: BEIJING BAIDU NETCOM SCIENCE TECHNOLOGY CO., LTD., Beijing (CN)

(72) Inventors: Ruoyu Guo, Beijing (CN); Yuning Du, Beijing (CN); Chenxia Li, Beijing (CN); Qiwen Liu, Beijing (CN); Baohua Lai, Beijing (CN); Yanjun Ma, Beijing (CN); Dianhai Yu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 300 days.

(21) Appl. No.: 18/170,902

(22) Filed: Feb. 17, 2023

(65) Prior Publication Data

US 2023/0206668 A1    Jun. 29, 2023

Related U.S. Application Data

(63) Continuation of application No. PCT/CN2022/100368, filed on Jun. 22, 2022.

(30) Foreign Application Priority Data

Feb. 25, 2022 (CN) .......................... 202210181868.0

(51) Int. Cl.
*G06V 30/19* (2022.01)
*G06V 30/16* (2022.01)
*G06V 30/18* (2022.01)

(52) U.S. Cl.
CPC ........ *G06V 30/19147* (2022.01); *G06V 30/16* (2022.01); *G06V 30/18* (2022.01); *G06V 30/19173* (2022.01)

(58) Field of Classification Search
CPC .. G06V 30/19147; G06V 30/16; G06V 30/18; G06V 30/19173; G06V 10/774; G06V 10/82
(Continued)

(56) References Cited

U.S. PATENT DOCUMENTS 11,170,470 B1 * 11/2021 He .......................... G06T 3/4007
12,125,264 B1 * 10/2024 Park ...................... G06T 7/0004
(Continued)

FOREIGN PATENT DOCUMENTS

CN     109919209 A    6/2019
CN     111046855 A    4/2020
(Continued)

OTHER PUBLICATIONS

Notice of Reasons for Refusal of corresponding Japanese Application No. 2023-512344, dated May 7, 2024, 18 pages.
(Continued)

*Primary Examiner* — Ming Shui
(74) *Attorney, Agent, or Firm* — Tucker Ellis LLP (57) ABSTRACT

The present disclosure provides a vision processing and model training method, device, storage medium and program product. A specific implementation solution is as follows: establishing an image classification network with the same backbone network as the vision model, performing a self-monitoring training on the image classification network by using an unlabeled first data set; initializing a weight of a backbone network of the vision model according to a weight of a backbone network of the trained image classification network to obtain a pre-training model, the
(Continued)

structure of the pre-training model being consistent with that of the vision model, and optimize the weight of the backbone network by using real data set in a current computer vision task scenario, so as to be more suitable for the current computer vision task; then, training the pre-training model by using a labeled second data set to obtain a trained vision model.

19 Claims, 5 Drawing Sheets

(58) Field of Classification Search
 USPC .......................................................... 358/159
 See application file for complete search history.

(56) References Cited

U.S. PATENT DOCUMENTS

| | | | | |
|---|---|---|---|---|
| 12,146,839 | B1* | 11/2024 | Jung | .................. G06T 7/0008 |
| 2022/0083813 | A1* | 3/2022 | Du | ..................... G06V 10/82 |
| 2022/0300764 | A1* | 9/2022 | Liu | .................. G06F 18/2148 |
| 2023/0132180 | A1* | 4/2023 | Hsieh | ..................... G06T 7/11 |
| | | | | 382/299 |

FOREIGN PATENT DOCUMENTS

| | | |
|---|---|---|
| CN | 111382871 A | 7/2020 |
| CN | 111666846 A | 9/2020 |
| CN | 112560874 A | 3/2021 |
| CN | 112749691 A | 5/2021 |
| CN | 112801164 A | 5/2021 |
| CN | 113139623 A | 7/2021 |
| CN | 113343707 A | 9/2021 |
| CN | 113378835 A | 9/2021 |
| CN | 113486745 A | 10/2021 |
| CN | 113627483 A | 11/2021 |
| CN | 113705301 A | 11/2021 |
| CN | 113706564 A | 11/2021 |
| CN | 113780342 A | 12/2021 |
| CN | 113780578 A | 12/2021 |
| CN | 113792581 A | 12/2021 |
| CN | 113837238 A | 12/2021 |
| CN | 113869449 A | 12/2021 |
| CN | 113963186 A | 1/2022 |
| CN | 113963183 B | 5/2022 |
| CN | 114549904 A | 5/2022 |
| EP | 3 944 148 A2 | 1/2022 |
| WO | 2020/192471 A1 | 10/2020 |
| WO | 2020/243556 A1 | 12/2020 |

OTHER PUBLICATIONS

Notice of Allowance of corresponding Chinese Application No. 202210181868.0, dated Jun. 2, 2023, 11 pages.
Office Action of corresponding Chinese Application No. 202210181868.0, dated May 8, 2023, 8 pages.
International Search Report of corresponding International Application No. PCT/CN2022/100368, dated Feb. 11, 2022, 12 pages.
First Office Action of corresponding Chinese Application No. 202210181868.0, dated Nov. 14, 2022, 22 pages.
Second Office Action of corresponding Chinese Application No. 202210181868.0, dated Feb. 9, 2023, 13 pages.
Baek et al., "What If We Only Use Real Datasets for Scene Text Recognition? Toward Scene Text Recognition With Fewer Labels", Jun. 5, 2021, 22 pages.
Shi et al., "An End-to-End Trainable Neural Network for Image-based Sequence Recognition and Its Application to Scene Text Recognition", Jul. 21, 2015, 9 pages.
Zhai et al., "S4L: Self-Supervised Semi-Supervised Learning", Jul. 23, 2019, 13 pages.
Zeng et al., "Self-supervised Chinese font generation based on square-block transformation", China Science: Information Science, Jan. 13, 2022, 16 pages.
Lee et al., "Rethinking Data Augmentation: Self-Supervision and Self-Distillation", Oct. 14, 2019, 11 pages.

* cited by examiner

VISION PROCESSING AND MODEL TRAINING METHOD, DEVICE, STORAGE MEDIUM AND PROGRAM PRODUCT

CROSS-REFERENCE TO RELATED DISCLOSURES

This present disclosure is a continuation of International Application No. PCT/CN2022/100368, filed on Jun. 22, 2022, which claims priority to Chinese Patent Application No. 202210181868.0, filed on Feb. 25, 2022, both of which are hereby incorporated by reference in their entireties.

TECHNICAL FIELD

The present disclosure relates to the fields of computer vision, deep learning and the like in computer technology, in particular to a vision processing and model training method, device, storage medium and program product.

BACKGROUND

OCR (Optical Character Recognition) is a technology that can transform image information into text information that is easier to edit and store. At present, the technology is widely used in various scenarios, such as bill recognition, bank card information recognition, formula recognition, etc. In addition, OCR also helps many downstream tasks, such as subtitle translation and security monitoring, etc. At the same time, it can also be applied to other computer vision tasks, such as video search and the like.

In various computer vision tasks such as target detection, image segmentation, text recognition, etc., it is usually necessary to train vision models for the computer vision tasks. In an actual scenario, although there are a lot of real image data, the cost of labeling the real image data is high. At present, it is mostly utilizing simple data with known labeled information to synthesize with background images, and performing the model training based on a large amount of synthesized data and a small amount of real data with labeled information, and there are mainly the following two ways: one is synthesizing a large amount of labeled data, and training a vision model based on the synthesized labeled data, and then training the vision model using real data and labeled information to obtain a final vision model; the other one is synthesizing a large amount of labeled data, and mixing the synthesized labeled data and real data together to be used as training data for training the vision model to obtain a final vision model. However, when the model is trained based on synthesized data, over-fitting often occurs due to that the synthesized data is too simple, which leads to a low accuracy of the trained model.

SUMMARY

There are provided a vision processing and model training method, a device, a storage medium and a program product.

According to a first aspect of the present disclosure, a vision model training method is provided, including:
establishing an image classification network, wherein the image classification network has the same backbone network as the vision model;
performing a self-monitoring training on the image classification network by using an unlabeled first data set to obtain a trained image classification network;
initializing a weight of a backbone network of the vision model according to a weight of a backbone network of the trained image classification network to obtain a pre-training model; and
training the pre-training model by using a labeled second data set to obtain a trained vision model.

According to a second aspect of the present disclosure, an electronic device is provided, including:
at least one processor; and
a memory communicatively connected to the at least one processor; wherein,
the memory stores instructions executable by the at least one processor, and the instructions are executed by the at least one processor to enable the at least one processor to perform the method according to the first aspect or the second aspect.

According to a third aspect of the present disclosure, a non-transitory computer-readable storage medium storing computer instructions is provided, wherein the computer instructions are used to cause a computer to perform the method according to the first aspect or the second aspect.

It should be understood that what is described in this section is neither intended to identify key or important features of the embodiments of the present disclosure, nor is intended to limit the scope of the present disclosure. Other features of the present disclosure will be readily understood from the following description.

BRIEF DESCRIPTION OF DRAWINGS

The accompanying drawings are used for a better understanding of the solution of the present disclosure and do not constitute a limitation of the present disclosure. Where.

DESCRIPTION OF EMBODIMENTS

Exemplary embodiments of the present disclosure will be explained hereunder with reference to the accompanying drawings, where various details of the embodiments of the present disclosure are included to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following descriptions.

The terms, for example, "first", "second" and "third" involved in this disclosure are only used for descriptive purposes, and cannot be understood as indicating or implying relative importance or implicitly indicating the number of indicated technical features. In the following descriptions of the embodiments, "a plurality of" means two or more, unless otherwise specifically defined.

OCR (Optical Character Recognition) is a technology that can transform image information into text information that is easier to edit and store. At present, the technology is widely used in various scenarios, such as bill recognition, bank card information recognition, formula recognition, etc. In addition, OCR also helps many downstream tasks, such as subtitle translation and security monitoring, etc. At the same time, it can also be applied to other computer vision tasks, such as video search and the like.

In various computer vision tasks such as target detection, image segmentation, text recognition, etc., it is usually necessary to train vision models for computer vision tasks.

In an actual scenario, although there are a lot of real image data, the cost of labeling the real image data is high. In order to improve the model training effect, the pre-training model in image classification can be used to accelerate the convergence process of the model and improve the accuracy of the model. However, in some computer vision tasks, such as OCR-based text recognition tasks, since the image data of the scenario of the text recognition task is very different from the data set used in the pre-training model of image classification, and the text recognition model is quite different from the pre-training model in structure, it is impossible to bring an accuracy gain of the text recognition model by directly loading the pre-training model based on image classification to train the text recognition model. Unlabeled text recognition data is very common and easy to obtain, but unlabeled data cannot be directly used to train the text recognition model.

At present, for the training of vision models, it is mostly utilizing simple data with known labeled information to synthesize with background images, and performing the model training based on a large amount of synthesized data and a small amount of real data with labeled information. There are mainly the following two ways: one is synthesizing a large amount of labeled data, and training a vision model based on the synthesized labeled data, and then training the vision model using real data and labeled information to obtain a final vision model; the other one is synthesizing a large amount of labeled data, and mixing the synthesized labeled data and real data together to be used as training data for training the vision model to obtain a final vision model.

However, when the model is trained based on synthesized data, over-fitting often occurs due to that the synthesized data is too simple, which leads to a low accuracy of the trained model.

The present disclosure provides a vision processing and model training method, device, storage medium and program product, which are applied to computer vision, deep learning and the like in computer technology, so as to improve the accuracy of the vision model.

The vision model training method provided by the present disclosure constructs an image classification network based on a vision model, so that the image classification network and the vision model have the same backbone network; uses an unlabeled first data set to perform a self-monitoring training on the image classification network and optimize the backbone network of the image classification network; initializes a weight of the backbone network of the vision model according to a weight of the trained image classification network, to obtain a pre-training model, where the backbone network of the pre-training model is consistent with the backbone network of the vision model, and since the unlabeled data set in the current computer vision task scenario is easy to be obtained, the pre-training model is trained based on the real unlabeled data set, so that the pre-training model is more suitable for the training of the vision model in the current computer vision task, and the effectiveness of the pre-training model is improved; then, uses a labeled second data set to train the pre-training model to obtain a trained vision model. This can improve the accuracy of the vision model.

In addition, even with a small amount of labeled data, a vision model having a high accuracy can be obtained through training.

The trained vision model can be applied to various computer vision task scenarios to perform a corresponding computer vision processing. For example, the vision model can be an OCR text recognition model for performing a text recognition processing on the input image to obtain text information contained in the input image.

The technical solution of the present application and how the technical solution of the present application solves the above technical problems will be described in detail with specific embodiments. The following specific embodiments can be combined with each other, and the same or similar concepts or processes will not be repeated in some embodiments. The embodiments of the present application will be described below with reference to the accompanying drawings.

Figure 1:
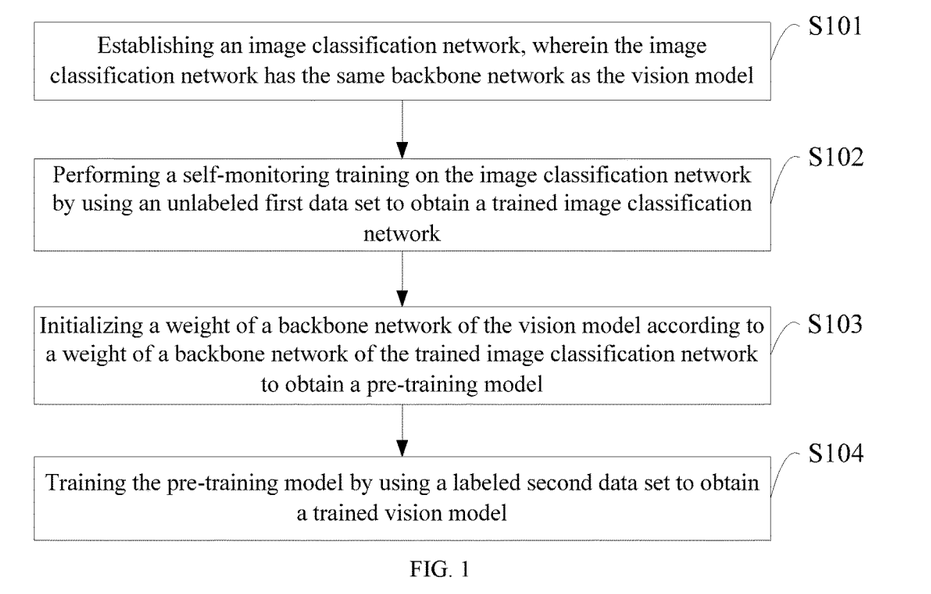
FIG. 1 is a flowchart of a vision model training method according to a first embodiment of the present disclosure.

FIG. 1 is a flowchart of a vision model training method according to a first embodiment of the present disclosure. The vision model training method provided by the present embodiment can be specifically applied to an electronic device, which is used to train the vision model.

As shown in FIG. 1, the specific steps of the present method are as follows.

Step S101, establishing an image classification network, wherein the image classification network has the same backbone network as the vision model.

Wherein, the image classification network includes a backbone network and a decoding module. The backbone network refers to a coding module in the network and is also a module for feature extraction.

In the present embodiment, an image classification network is established based on the vision model, so that the image classification network and the vision model have the same backbone network, that is, the image classification network and the vision model have a consistent coding module for feature extraction, but have different decoding modules.

Step S102, performing a self-monitoring training on the image classification network by using an unlabeled first data set to obtain a trained image classification network.

Where, the first data set is an unlabeled data set, and contains the real image data in the current computer vision task scenario. In addition, the first data set may also include synthesized data.

In the present embodiment, a self-monitoring training on the image classification network is performed based on the unlabeled first data set of the current computer vision task scenario, so as to optimize the weight of the backbone network of the image classification network, so that the backbone network is more suitable for the current computer vision task, the feature extraction is better performed when applied to the computer vision task, and there is no need to use a labeled data set.

Step S103, initializing a weight of a backbone network of the vision model according to a weight of a backbone network of the trained image classification network to obtain a pre-training model.

After the self-monitoring training of the image classification network is completed by using the unlabeled first data set, the weight of the backbone network of the trained image classification network is taken as an initial weight of the backbone network of the vision model, and the vision model is initialized to obtain a pre-training model, which has the same structure as the vision model, and the weight of the backbone network in the pre-training model is optimized by using the real data set in the current computer vision task scenario.

Step S104, training the pre-training model by using a labeled second data set to obtain a trained vision model.

Where, the second data set is a labeled data set, and contains real image data and labeling information in the current computer vision task scenario.

Since the pre-training model obtained in step S103 is consistent with the vision model in structure, and the weight of the backbone network in the pre-training model is optimized by using the real data set in the current computer vision task scenario, the final vision model, which is obtained, based on the pre-training model, by using the labeled second data set in the current computer vision task scenario, can effectively improve the accuracy of the vision model. Even with a small amount of labeled data, a vision model with high accuracy can be trained.

In the present embodiment, an image classification network having the same backbone network as the vision model is established, an unlabeled first data set is used for performing a self-monitoring training on the image classification network to obtain a trained image classification network; a weight of a backbone network of the vision model is initialized according to a weight of a backbone network of the trained image classification network to obtain a pre-training model, the structure of the pre-training model is consistent with that of the vision model, and the weight of the backbone network in the pre-training model is optimized by using the real data set in a current computer vision task scenario, so as to be more suitable for the current computer vision task; then, the pre-training model is trained by using the labeled second data set to obtain a trained vision model. This can effectively improve the accuracy of the vision model.

Figure 2:
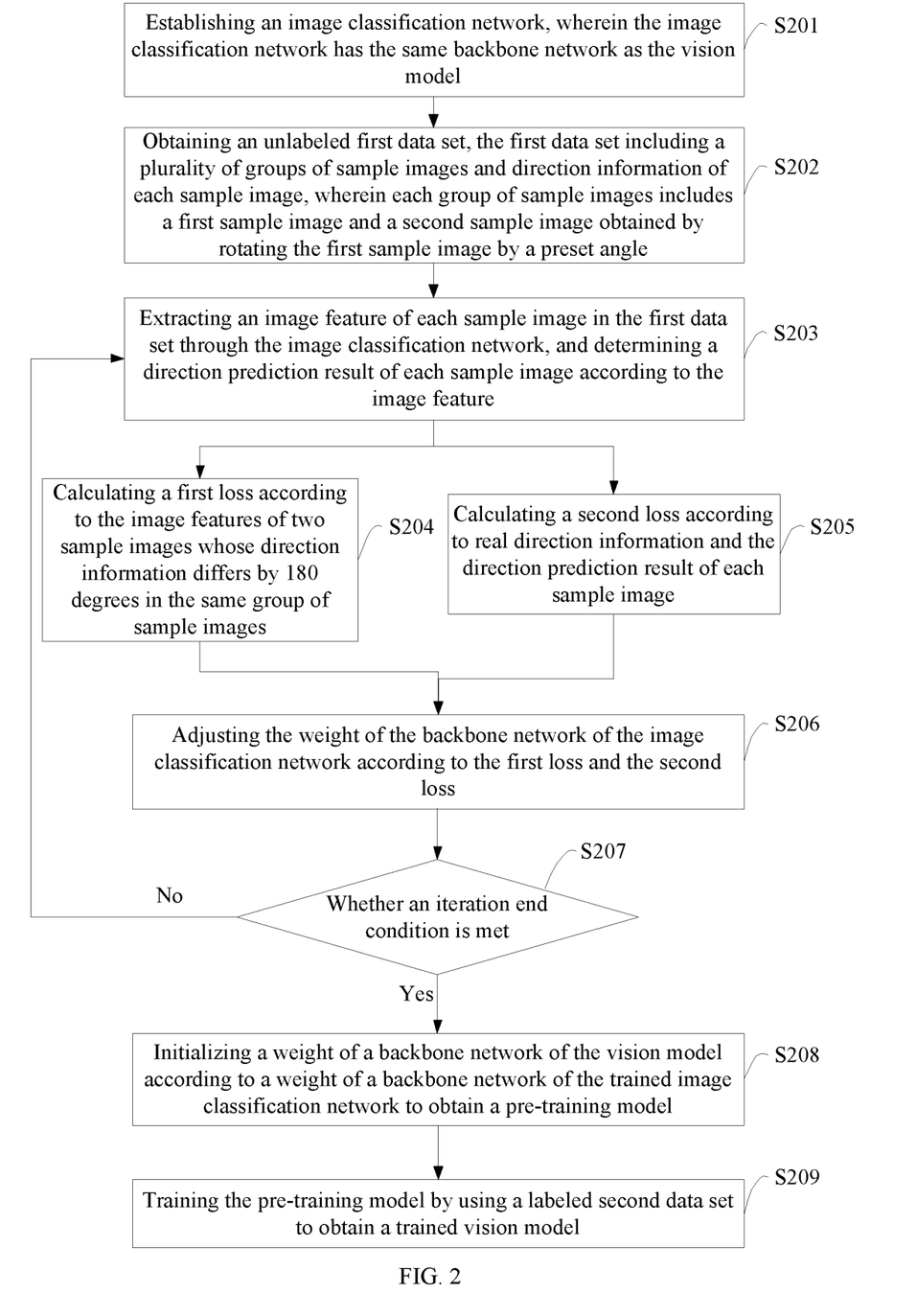
FIG. 2 is a flowchart of a vision model training method according to a second embodiment of the present disclosure.

FIG. 2 is a flowchart of a vision model training method according to a second embodiment of the present disclosure. On the basis of the above-mentioned first embodiment, in the present embodiment, performing a self-monitoring training on the image classification network by using the unlabeled first data set to obtain the trained image classification network includes: obtaining the unlabeled first data set, where the first data set includes a plurality of groups of sample images and direction information of each sample image, where each group of sample images includes a first sample image and a second sample image obtained by rotating the first sample image by a preset angle; extracting an image feature of each sample image in the first data set through the image classification network, and determining a direction prediction result of each sample image according to the image feature; calculating a first loss according to the image features of two sample images whose direction information differs by 180 degrees in the same group of sample images; calculating a second loss according to real direction information and the direction prediction result of each sample image; adjusting the weight of the backbone network of the image classification network according to the first loss and the second loss, so that the self-monitoring training of the image classification network can be realized by using the unlabeled data set, and the weight of the backbone network of the image classification network is optimized, which makes the backbone network more suitable for feature extraction of the computer vision task and can improve the accuracy of the finally obtained vision model.

As shown in FIG. 2, the specific steps of the method are as follows.

Step S201, establishing an image classification network, wherein the image classification network has the same backbone network as the vision model.

Wherein, the image classification network includes a backbone network and a decoding module. The backbone network refers to a coding module in the network and is also a module for feature extraction.

In the present embodiment, the image classification network is established based on the vision model, so that the image classification network and the vision model have the same backbone network, that is, the coding modules for feature extraction in both the image classification network and the vision model are consistent, but their decoding modules are different.

Exemplarily, the vision model being text recognition model is taken as an example, the text recognition model can be realized by CRNN (Convolutional Recurrent Neural Network), RARE (Robust text recognizer with Automatic Correction), NRTR, etc. The backbone network of the image classification network is used to realize feature extraction in CRNN, RARE and NRTR. Wherein, CRNN is mainly used for end-to-end recognition of text sequence with indefinite length, and instead of cutting a single text first, it transforms a text recognition into a time-dependent sequence learning problem, that is, an image-based sequence recognition. CRNN mainly includes convolutional layer, recurrent layer and transcriptional layer, and finally realizes the prediction of a sequence with indefinite length using a fixed-length input.

The decoding module image classification network is used for decoding to obtain a classification result according to the feature extracted by the backbone network.

Step S202, obtaining an unlabeled first data set, wherein the first data set includes a plurality of groups of sample images and direction information of each sample image, wherein each group of sample images includes a first sample image and a second sample image obtained by rotating the first sample image by a preset angle.

Wherein, the first data set is an unlabeled data set, and contains the real image data in the current computer vision task scenario. In addition, the first data set may also include synthesized data.

In an actual computer vision task scenario, it is easy to obtain a large amount of real image data, and synthesized data may not be used so as to reduce the procedure of synthetizing data and remove the dependence on synthesized data.

In the present embodiment, a large amount of real image data of the current computer vision task scenario is obtained, to generate the first data set, and there is no need to label the first data set.

Specifically, this step can be realized in the following way:

obtaining an unlabeled first sample image and determining direction information of the first sample image as 0 degrees; rotating the first sample image by a preset angle to obtain a second sample image, and determining direction information of the second sample image as the preset angle.

Wherein, the preset angle includes one or more different angles, and can be set according to the actual application scenario, and is not specifically limited here.

In an embodiment, the preset angle may only include 180 degrees.

In an embodiment, the preset angle may include 180 degrees and at least one angle other than 180 degrees. For example, the preset angle may include 90 degrees and 180 degrees.

In an embodiment, the preset angle may include a first angle and a second angle, and the difference between the first angle and the second angle is 180 degrees. For example, the preset angle may include 90 degrees and 270 degrees.

In an embodiment, the preset angle may include a first angle, a second angle and at least one third angle, wherein the difference between the first angle and the second angle is 180 degrees. For example, the preset angle may include 90 degrees (first angle), 270 degrees (second angle), and 180 degrees (third angle).

In the present embodiment, the direction information of the first sample image is set to 0 degrees, and the direction information of the second sample image obtained by rotating by the preset angle is set to be the corresponding rotation angle.

Exemplarily, taking the first sample image being rotated by 90 degrees, 180 degrees and 270 degrees respectively as an example, the obtained direction information of three second sample images is 90 degrees, 180 degrees and 270 degrees in sequence, while the direction information of the first sample image is 0 degrees.

Each first sample image and the second sample image obtained by rotating the each first sample image are a group of sample images. A first loss is determined based on two sample images whose direction information differs by 180 degrees in the same group of sample images, and a second loss is determined based on the direction prediction result and real direction information of the same sample image. This can enrich the loss functions used for self-monitoring training and improve the training effect of the pre-training model.

In addition, by setting a plurality of preset angles, in addition to two sample images whose direction information differs by 180 degrees, the same group of sample images can include sample images with other direction information, which can further enrich the sample data and improve the training effect of the pre-training model.

Further, the obtaining the unlabeled first sample image can be realized in the following way:

obtaining an original image, wherein the original image includes at least one of a synthetic image and a real image; performing a preprocessing on the original image to obtain a sample image meeting a model training requirement; performing a random data augmentation on the sample image to obtain the first sample image.

Wherein, each original image is a real image or a synthetic image in the current computer vision task scenario.

In the process of model training, there are requirements for information such as the size of the sample image input into the model, whether it contains specific contents such as faces and texts. By preprocessing each original image, the processed sample image can meet the training requirement of the model, thereby ensuring that the sample image can be used for training the image classification model, to improve the training effect of the image classification model.

In an embodiment, if the vision model is applied to a text recognition scenario, performing a preprocessing on the original image to obtain the sample image meeting the model training requirement includes:

performing a text detection on the original image, and extracting an image of a region where text information is located; performing an image correction on the image of the region where the text information is located to obtain the sample image meeting the model training requirement, thereby ensuring that the sample image can be used for training the image classification model to improve the training effect of the image classification model.

Exemplarily, the text detection model can be used to perform text detection on the original image, and extract the image of the region where the text information is located to obtain the text detection result. The text detection result may be polygonal. An affine transformation method is used to perform an image correction on the text detection result to obtain a sample image that meets the requirement of model training. It is usually required that the frame of the sample image is a rectangular frame.

In addition, performing the random data augmentation on the sample image to obtain the first sample image may greatly increase the number of the sample image, which makes the first data sets richer.

In addition, step S202 may be executed after step S201, or step S202 may be executed before step S201, and the execution order of S202 and S201 is not specifically limited here.

It should be noted that the number of categories of the image classification model is set to be related to the number of the preset angle, and the number of categories of the image classification model is equal to the number of the preset angle plus 1. The image classification model is used to classify the direction information of the sample image and predict the direction information corresponding to the sample image.

Exemplarily, taking the preset angles including 90 degrees, 180 degrees and 270 degrees as an example, the number of categories of the image classification model is set to 4, and the image classification model is used to predict which one of the 0, 90, 180 and 270 degrees is the direction information of the sample image input.

After the unlabeled first data set is obtained, steps S203-S207 are executed circularly, and an iterative self-monitoring training is performed on the image classification model based on the unlabeled first data set, and iteration is stopped until the iteration end condition is met.

Step S203, extracting an image feature of each sample image in the first data set through the image classification network, and determining a direction prediction result of each sample image according to the image feature.

In this step, the sample image in the first data set is input into the image classification network, and the image feature of the sample image is extracted through the backbone network of the image classification network, and the direction information of the sample image is predicted through the decoding module of the image classification network according to the image feature of the sample image, to obtain the direction prediction result of the sample image.

In an embodiment, the sample image is normalized before being input into the image classification network.

In the present embodiment, two loss functions are used in the self-monitoring training of the image classification network, wherein one loss function is used to calculate the first loss according to the image features of two sample images whose direction information differs by 180 degrees in the same group of sample images, and the other loss function is used to calculate the second loss according to the real direction information and direction prediction result of each sample image. This can enrich the loss functions used in the monitoring training and improve the effect of model training.

Step S204, calculating a first loss according to the image features of two sample images whose direction information differs by 180 degrees in the same group of sample images.

In an embodiment, the preset angle at least includes 180 degrees. This step can be specifically realized in the following way:

calculating the first loss according to a difference between an image feature obtained by rotating an image feature of the first sample image by 180 degrees and an image feature of the second sample image obtained by rotating the first sample image by 180 degrees in each group of sample images.

The first loss calculated in this way can accurately reflect the difference between the image features of two sample images whose direction information differs by 180 degrees in the same group of sample images. Based on the first loss, self-monitoring training of the image classification model is performed, to enable the backbone network of the image classification model to learn the rotation angle of the image, so that the feature extraction module can better extract the image feature, which can further improve the robustness of the image classification model, and thus improve the accuracy of the final vision model.

In another embodiment, the preset angle at least includes a first angle and a second angle, the second angle is equal to the first angle plus 180 degrees, and the first angle is not 0 degrees. For example, the first angle is 90 degrees and the second angle is 270 degrees.

This step can be specifically realized in the following way:

calculating the first loss according to a difference between an image feature obtained by rotating an image feature of a sample image whose direction information is the first angle by 180 degrees and an image feature of a sample image whose direction information is the second angle, in the same group of sample images.

The first loss calculated in this way can also accurately reflect the difference between the image features of two sample images whose direction information differs by 180 degrees in the same group of sample images. Based on the first loss, self-monitoring training of the image classification model is performed, to enable the backbone network of the image classification model to learn the rotation angle of the image, so that the feature extraction module can better extract the image features, which can further improve the robustness of the image classification model, and thus improve the accuracy of the final vision model.

Exemplarily, according to the image features of the same sample image after being rotated by 90 degrees and 270 degrees respectively, the image feature of the sample image after being rotated by 90 degrees is taken as a first feature, and the image feature of the sample image after being rotated by 270 degrees is taken as a second feature, and the first loss is calculated according to the difference between the feature obtained after the first feature is rotated by 180 degrees and the second feature.

In an embodiment, when the preset angle includes both 180 degrees and the first and second angles, the above two embodiments can be combined in this step to calculate the first loss.

In an embodiment, the first loss may be an L2 loss. In addition, the first loss can be an L1 loss, or a loss calculated by using other loss function with similar effect, and the present embodiment is not specifically limited here.

Step S205, calculating a second loss according to real direction information and the direction prediction result of each sample image.

In this step, the second loss is calculated according to the difference between the real direction information and the direction prediction result of each sample image.

In an embodiment, a cross entropy loss function, or other loss functions commonly used for measuring the quality of classification results in classification models can be used to calculate the second loss, and the present embodiment has no specific limit on this here.

In the present embodiment, step S204 and step S205 may be performed in parallel or sequentially in any order.

Step S206, adjusting the weight of the backbone network of the image classification network according to the first loss and the second loss.

After calculating the first loss and the second loss, the weight of the backbone network of the image classification network is adjusted according to the first loss and the second loss to optimize the weight of the backbone network.

In an embodiment, a sum of the first loss and the second loss can be calculated as a final loss; the weight of the backbone network of the image classification network is adjusted according to the final loss, and two different loss functions can be combined to perform the self-monitoring training on the image classification network and improve the robustness and effectiveness of the image classification network.

Step S207, whether an iteration end condition is met.

After completing an iterative training of the image classification network through the above steps S203-S206, whether the iterative end condition is met is determined.

If the iteration end condition is met, the iteration is stopped, and the image classification model with the highest direction classification accuracy is determined as a trained image classification model, and the step S208 is continued.

If the iteration end condition is not met, step S203 is continued and the next iteration is started.

Wherein, the iteration end condition can include at least one of the following: the number of iterations reaches a preset threshold, the final loss is less than a loss threshold, and a change of the weight value between two iterations is already small.

Step S208, initializing a weight of a backbone network of the vision model according to the weight of the backbone network of the trained image classification network to obtain a pre-training model.

After the self-monitoring training of the image classification network is completed by using the unlabeled first data set, the weight of the trained image classification network is taken as an initial weight of the backbone network of the vision model, and the vision model is initialized to obtain a pre-training model, the pre-training model has the same structure as the vision model, and the weight of the backbone network in the pre-training model is optimized by using the real data set in the current computer vision task scenario.

Step S209, training the pre-training model by using a labeled second data set to obtain a trained vision model.

Wherein, the second data set is a labeled data set, and contains real image data and labeled information in the current computer vision task scenario.

The structure of the pre-training model is consistent with the structure of the vision model, and the weight of the backbone network in the pre-training model is optimized by using the real data set in the current computer vision task scenario. The labeled second data set in the current computer vision task scenario is used to train the pre-training model again to obtain a final vision model, which can effectively improve the accuracy of the vision model. Even with a small amount of labeled data, a vision model with high accuracy can be trained.

In the present embodiment, an image classification network having the same backbone network as the vision model is established, an unlabeled first data set is used for performing a self-monitoring training on the image classification network to obtain a trained image classification network, the unlabeled data is fully used for training the backbone network for feature extraction; further, two kinds of loss functions are used in the self-monitoring training of the image classification network, a first loss is calculated according to image features of two sample images whose direction information differs by 180 degrees in the same group of sample images, and a second loss is calculated according to the real direction information and direction prediction result of each sample image is calculated, the weight of the backbone network is optimized based on the first loss and the second loss, the loss of classification result and the loss of image feature alignment are considered simultaneously, which can enrich the loss functions for monitoring training and improve the robustness of the pre-training model and the accuracy of feature extraction. On this basis, according to the weight of the backbone network of the trained image classification network, the weight of the backbone network of the vision model is initialized, to obtain the pre-training model. The structure of the pre-training model is consistent with that of the vision model, and the weight of the backbone network in the pre-training model is optimized by using the real data set in a current computer vision task scenario, which is more suitable for the current computer vision task; then, the pre-training model is trained by using the labeled second data set to obtain a trained vision model. This can effectively improve the accuracy of the vision model.

Figure 3:
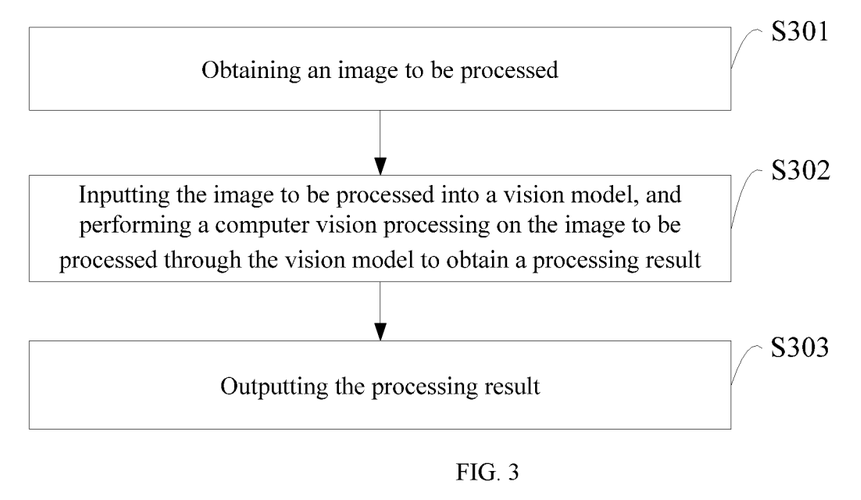
FIG. 3 is a flowchart of a vision processing method according to a third embodiment of the present disclosure.

FIG. 3 is a flowchart of a vision processing method according to a third embodiment of the present disclosure. The vision processing method provided by the present embodiment can be specifically applied to an electronic device, which is used to realize a vision processing of an image by using a trained vision model.

As shown in FIG. 3, the specific steps of the method are as follows.

Step S301, obtaining an image to be processed.

Step S302, inputting the image to be processed into a vision model, and performing a computer vision processing on the image to be processed through the vision model to obtain a processing result.

Wherein the vision model is trained by the method according to the first embodiment or the second embodiment, and the specific training process thereof will not be repeated here.

Exemplarily, the vision model may be a text recognition model. For the trained text recognition model, by inputting the image to be processed into the text recognition model and performing a text recognition processing on the input image through the text recognition model, the processing result obtained is the text information contained in the input image.

Step S303, outputting the processing result.

In the present embodiment, a vision processing is performed on the input image through a trained vision model, to obtain a vision processing result and output it.

Figure 4:
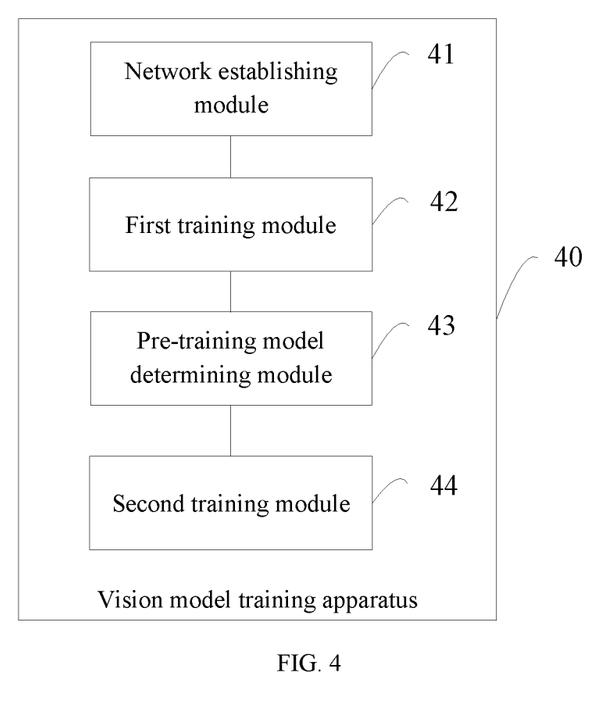
FIG. 4 is a schematic structural diagram of a vision model training apparatus according to a fourth embodiment of the present disclosure.

FIG. 4 is a schematic structural diagram of a vision model training apparatus according to a fourth embodiment of the present disclosure. The vision model training apparatus provided by the embodiment of the present disclosure can execute the processing flow provided by the embodiment of vision model training method. As shown in FIG. 4, the vision model training apparatus 40 specifically includes:

a network establishing module 41, configured to establish an image classification network, wherein the image classification network has the same backbone network as the vision model;

a first training module 42, configured to perform a self-monitoring training on the image classification network by using an unlabeled first data set to obtain a trained image classification network;

a pre-training model determining module 43, configured to initialize a weight of a backbone network of the vision model according to a weight of a backbone network of the trained image classification network to obtain a pre-training model; and a second training module 44, configured to train the pre-training model by using a labeled second data set to obtain a trained vision model.

The apparatus provided by the embodiment of the present disclosure can be specifically used for executing the method embodiment provided by the first embodiment, and the specific functions realized are not repeated here.

In the present embodiment, an image classification network having the same backbone network as the vision model is established, an unlabeled first data set is used for performing a self-monitoring training on the image classification network to obtain a trained image classification network; a weight of a backbone network of the vision model is initialized according to a weight of a backbone network of the trained image classification network to obtain a pre-training model, the structure of the pre-training model is consistent with that of the vision model, and the weight of the backbone network in the pre-training model is optimized by using the real data set in a current computer vision task scenario, so as to be more suitable for the current computer vision task; then, the pre-training model is trained by using the labeled second data set to obtain a trained vision model. This can effectively improve the accuracy of the vision model.

Figure 5:
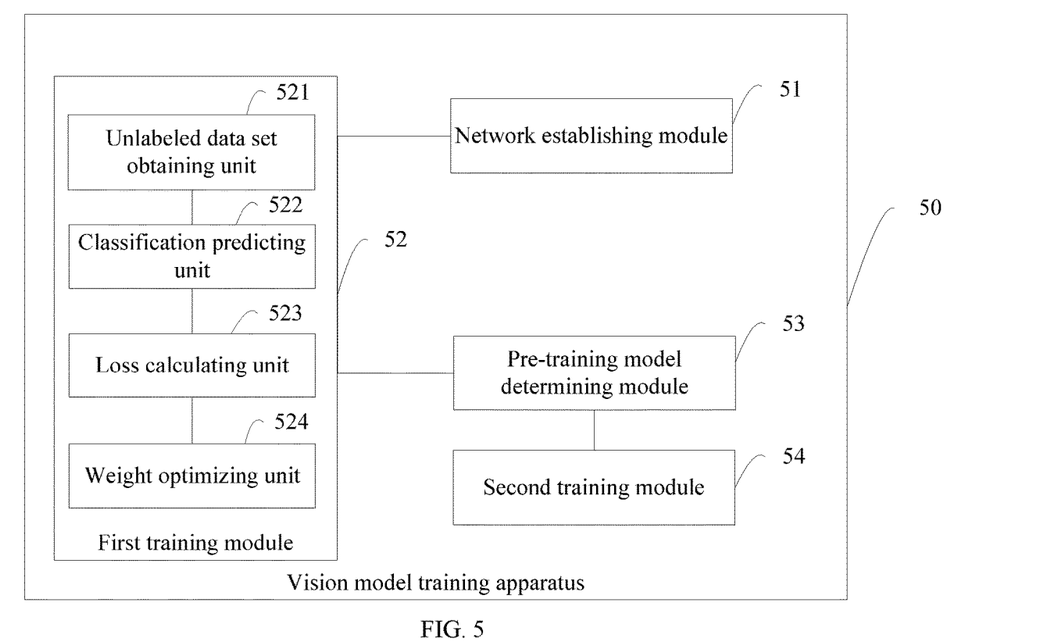
FIG. 5 is a schematic structural diagram of a vision model training apparatus according to a fifth embodiment of the present disclosure.

FIG. 5 is a schematic structural diagram of a vision model training apparatus according to a fifth embodiment of the present disclosure. The vision model training apparatus provided by the embodiment of the present disclosure can execute the processing flow provided by the embodiment of vision model training method. As shown in FIG. 5, the vision model training apparatus 50 specifically includes:

a network establishing module 51, configured to establish an image classification network, wherein the image classification network has the same backbone network as the vision model;

a first training module 52, configured to perform a self-monitoring training on the image classification network by using an unlabeled first data set to obtain a trained image classification network;

a pre-training model determining module 53, configured to initialize a weight of a backbone network of the vision model according to a weight of a backbone network of the trained image classification network to obtain a pre-training model; and a second training module 54, configured to train the pre-training model by using a labeled second data set to obtain a trained vision model.

In an embodiment, as illustrated in FIG. 5, the first training module 52 includes:

an unlabeled data set obtaining unit 521, configured to obtain the unlabeled first data set, the first data set including a plurality of groups of sample images and direction information of each sample image, wherein each group of sample images includes a first sample image and a second sample image obtained by rotating the first sample image by a preset angle;

a classification predicting unit 522, configured to extract an image feature of each sample image in the first data set through the image classification network, and determine a direction prediction result of each sample image according to the image feature;

a loss calculating unit 523, configured to calculate a first loss according to the image features of two sample images whose direction information differs by 180 degrees in the same group of sample images; and calculate a second loss according to real direction information and the direction prediction result of each sample image; and a weight optimizing unit 524, configured to adjust the weight of the backbone network of the image classification network according to the first loss and the second loss.

In an embodiment, the unlabeled data set obtaining unit includes:

a sample image obtaining subunit, configured to obtain an unlabeled first sample image and determine direction information of the first sample image as 0 degrees; and an image rotating subunit, configured to rotate the first sample image by the preset angle to obtain the second sample image, and determine direction information of the second sample image as the preset angle.

In an embodiment, the preset angle at least includes 180 degrees, and the loss calculating unit includes:

a first loss calculating subunit, configured to calculate the first loss according to a difference between an image feature obtained by rotating an image feature of the first sample image by 180 degrees and an image feature of the second sample image obtained by rotating the first sample image by 180 degrees in each group of sample images.

In an embodiment, the preset angle at least includes a first angle and a second angle, the second angle is equal to the first angle plus 180 degrees, and the first angle is not 0 degrees, and the loss calculating unit includes:

a second loss calculating subunit, configured to calculate the first loss according to a difference between an image feature obtained by rotating an image feature of a sample image whose direction information is the first angle by 180 degrees and an image feature of a sample image whose direction information is the second angle in the same group of sample images.

In an embodiment, the sample image obtaining subunit is further configured to:

obtain an original image, wherein the original image includes at least one of a synthetic image and a real image;

perform a preprocessing on the original image to obtain a sample image meeting a model training requirement;

perform a random data augmentation on the sample image to obtain the first sample image.

In an embodiment, the sample image obtaining subunit is further configured to:

perform a text detection on the original image, and extract an image of a region where text information is located; and perform an image correction on the image of the region where the text information is located to obtain the sample image meeting the model training requirement.

In an embodiment, the weight optimizing unit is further configured to:

calculate a sum of the first loss and the second loss as a final loss; and adjust the weight of the backbone network of the image classification network according to the final loss.

The apparatus provided by the embodiment of the present disclosure can be specifically used to execute the method embodiment provided by the second embodiment, and the specific functions realized are not repeated here.

In the present embodiment, an image classification network having the same backbone network as the vision model is established, an unlabeled first data set is used for performing a self-monitoring training on the image classification network to obtain a trained image classification network, the unlabeled data is fully used for training the backbone network for feature extraction; further, two kinds of loss functions are used in the self-monitoring training of the image classification network, a first loss is calculated according to image features of two sample images whose direction information differs by 180 degrees in the same group of sample images, and a second loss is calculated according to the real direction information and direction prediction result of each sample image, the weight of the backbone network is optimized based on the first loss and the second loss, the loss of classification result and the loss of image feature alignment are considered simultaneously, which can enrich the loss functions for monitoring training and improve the robustness of the pre-training model and the accuracy of feature extraction. On this basis, according to the weight of the backbone network of the trained image classification network, the weight of the backbone network of the vision model is initialized, to obtain the pre-training model. The structure of the pre-training model is consistent with that of the vision model, and the weight of the backbone network in the pre-training model is optimized by using the real data set in a current computer vision task scenario, which is more suitable for the current computer vision task; then, the pre-training model is trained by using the labeled second data set to obtain a trained vision model. This can effectively improve the accuracy of the vision model.

Figure 6:
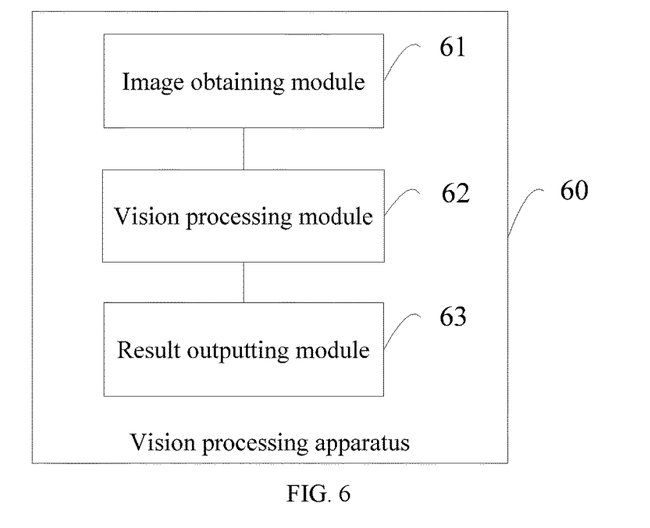
FIG. 6 is a schematic structural diagram of a vision processing apparatus according to a sixth embodiment of the present disclosure.

FIG. 6 is a schematic structural diagram of a vision processing apparatus according to a sixth embodiment of the present disclosure. The vision processing apparatus provided by the embodiment of the present disclosure can execute the processing flow provided by the embodiment of the vision processing method. As shown in FIG. 6, the vision processing apparatus 60 includes an image obtaining module 61, a vision processing module 62 and a result outputting module 63.

Specifically, the image obtaining module 61 is configured to obtain an image to be processed.

The vision processing module 62 is configured to input the image to be processed into a vision model, and perform a computer vision processing on the image to be processed through the vision model to obtain a processing result, wherein the vision model is generated by the apparatus of the fourth embodiment or the fifth embodiment above.

The result outputting module 63 is configured to output the processing result.

The apparatus provided by the present embodiment of the present disclosure can be specifically used for executing the method embodiment provided by the above third embodiment, and the specific functions realized are not repeated here.

In the technical solution of the present disclosure, the collection, storage, use, processing, transmission, provision, disclosure and the like of the personal information of the user involved all comply with the provisions of relevant laws and regulations, and do not violate public order and good customs.

According to an embodiment of the present disclosure, the present disclosure also provides an electronic device, a readable storage medium and a computer program product.

According to an embodiment of the present disclosure, the present disclosure also provides a computer program product, which includes: a computer program, the computer program is stored in a readable storage medium, at least one processor of the electronic device can read the computer program from the readable storage medium, the computer program is executed by the at least one processor to enable the electronic device to execute the solution provided by any of the above embodiments.

Figure 7:
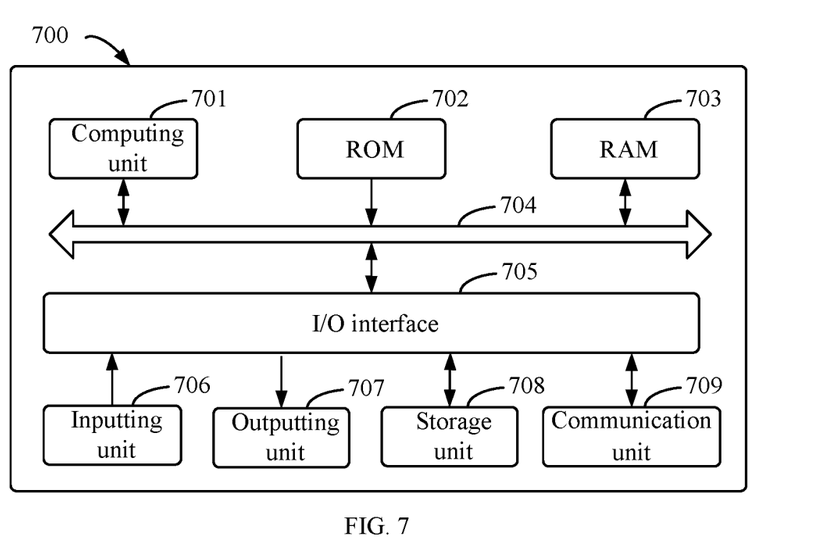
FIG. 7 is a block diagram of an electronic device for implementing the vision model training method according to embodiments of the present disclosure.

FIG. 7 shows a schematic block diagram of an exemplary electronic device 700 that can be used to implement an embodiment of the present disclosure. The electrical device is intended to represent various forms of digital computers, such as a laptop computer, a desktop computer, a workstation, a personal digital assistant, a server, a blade server, a mainframe computer, and other suitable computer. The electronic device can also represent various forms of mobile devices, such as a personal digital assistant, a cellular phone, a smart phone, wearable device, and other similar computing device. The components shown herein, their connections and relationships, and their functions are merely exemplary, and are not intended to limit the implementation of the present disclosure described and/or required herein.

As shown in FIG. 7, the electronic device 700 includes a computing unit 701, which can perform various appropriate actions and processing based on a computer program stored in a read only memory (ROM) 702 or a computer program loaded from a storage unit 708 to a random access memory (RAM) 703. The RAM 703 can also store various programs and data required for the operation of the device 700. The computing unit 701, the ROM 702, and the RAM 703 are connected to each other through a bus 704. An inputting/outputting (I/O) interface 705 is also connected to the bus 704.

Multiple components in the device 700, including: an inputting unit 706, such as a keyboard, a mouse, etc.; an outputting unit 707, such as various types of displays, speakers, etc.; and a storage unit 708, such as a disk, optical disc, etc.; and a communication unit 709, such as network card, modem, wireless communication transceiver, etc., are connected to the I/O interface 705. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, and digital signal processor (DSP), and any appropriate processor, controller, micro-controller, etc. The computing unit 701 executes the various methods and processes described above, for example, vision model training method or vision processing method. For example, in some embodiments, the vision model training method or the vision processing method may be implemented as a computer software program, which is tangibly contained in a machine-readable medium, such as the storage unit 708. In some embodiments, part or all of the computer program may be loaded and/or installed to the device 700 via the ROM 702 and/or the communication unit 709. When the computer program is loaded into the RAM 703 and executed by the computing unit 701, one or more steps of the vision model training method or the vision processing method described above can be executed. Alternatively, in other embodiments, the computing unit 701 may be configured to execute the vision model training method in any other suitable manner (for example, by means of firmware).

Various implementations of the systems and technologies described above in the present disclosure can be implemented in a digital electrical circuit system, an integrated circuit system, a field programmable gate array (FPGA), an application specific integrated circuit (ASIC), an application-specific standard product (ASSP), a system on chip system (SOC), complex-programmable logic device (CPLD), computer hardware, firmware, software, and/or a combination thereof. These various implementations may include: being implemented in one or more computer programs, the one or more computer programs may be executed and/or interpreted on a programmable system including at least one programmable processor, the programmable processor can be a dedicated or general-purpose programmable processor that can receive data and instructions from the storage system, at least one input device, and at least one output device, and transmit the data and instructions to the storage system, the at least one input device, and the at least one output device.

The program code for implementing the method of the present disclosure can be written in any combination of one or more programming languages. These program codes can be provided to a processor or controller of a general-purpose computer, a special-purpose computer, or other programmable data processing device, so that the program codes, when executed by the processor or controller, enable the functions/operations specified in the flowchart and/or block diagram to be implemented. The program code can be executed entirely or partly on the machine, or as an independent software, partly on the machine and partly on the remote machine package, or entirely on the remote machine or server.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electrical, magnetic, optical, electromagnetic, infrared, or semiconductor system, apparatus, or device, or any suitable combination of the foregoing. More specific examples of the machine-readable storage medium would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In order to provide interaction with the user, the system and technology described herein can be implemented on a computer that has: a display device for displaying information to the user (for example, a CRT (cathode ray tube) or LCD (liquid crystal display) monitor); and a keyboard and pointing device (for example, a mouse or a trackball) through which the user can provide input to the computer. Other types of devices can also be used to provide interaction with the user; for example, the feedback provided to the user can be any form of sensory feedback (for example, visual feedback, auditory feedback, or tactile feedback); and any form (including acoustic input, voice input, or tactile input) can be used to receive input from the user.

The systems and technologies described herein can be implemented in a computing system including back-end components (for example, a data server), or a computing system including intermediate components (for example, an application server), or a computing system including front-end components (for example, a user computer with a graphical user interface or a web browser, through which the user can interact with the implementation of the system and technology described herein), or a computing system including any combination of such back-end components, intermediate components, or front-end components. The components of the system can be connected to each other through digital data communication (for example, a communication network) of any form or of medium. Examples of the communication network include: local area network (LAN), wide area network (WAN), and the Internet.

The computer system may include a client and a server. The client and server are generally far away from each other and usually interact through a communication network. The relationship between the client and the server is generated by computer programs that run on the corresponding computers and have a client-server relationship with each other. The server can be a cloud server, also known as a cloud computing server or a cloud host, and it is a host product in the cloud computing service system to solve the existing shortcomings of difficult management and weak business scalability in traditional physical host and VPS service ("Virtual Private Server", or "VPS" for short). The server can also be a server of a distributed system, or a server combined with a block-chain.

It should be understood that the various forms of processes shown above can be used, including reordering, adding or deleting step(s). For example, the steps described in the present disclosure can be executed in parallel, sequentially, or in a different order, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A vision model training method, executed by a processor, comprising:
   establishing an image classification network, wherein the image classification network has the same backbone network as a vision model;
   performing a self-monitoring training on the image classification network by using an unlabeled first data set to obtain a trained image classification network;
   initializing a weight of the backbone network of the vision model according to a weight of the backbone network of the trained image classification network to obtain a pre-training model;
   training the pre-training model by using a labeled second data set to obtain a trained vision model; and
   applying the trained vision model to a computer vision task to perform a corresponding computer vision processing to obtain a processing result,
   wherein the computer vision task comprises target detection, image segmentation, and text recognition, and
   wherein performing the self-monitoring training on the image classification network by using the unlabeled first data set to obtain the trained image classification network comprises:
   obtaining the unlabeled first data set, the first data set comprising a plurality of groups of sample images and direction information of each sample image, wherein each group of sample images comprises a first sample image and a second sample image obtained by rotating the first sample image by a preset angle;
   extracting an image feature of each sample image in the first data set through the image classification network, and determining a direction prediction result of each sample image according to the image feature;
   calculating a first loss according to the image features of two sample images whose direction information differs by 180 degrees in the same group of sample images; and calculating a second loss according to real direction information and the direction prediction result of each sample image; and
   adjusting the weight of the backbone network of the image classification network according to the first loss and the second loss.

2. The method according to claim 1, wherein the obtaining the unlabeled first data set comprises:
   obtaining an unlabeled first sample image and determining direction information of the first sample image as 0 degrees;
   rotating the first sample image by the preset angle to obtain the second sample image, and determining direction information of the second sample image as the preset angle.

3. The method according to claim 2, wherein the preset angle at least comprises 180 degrees,
   calculating the first loss according to the image features of two sample images whose direction information differs by 180 degrees in the same group of sample images comprises:
   calculating the first loss according to a difference between an image feature obtained by rotating an image feature of the first sample image by 180 degrees and an image feature of the second sample image obtained by rotating the first sample image by 180 degrees in each group of sample images.

4. The method according to claim 2, wherein the preset angle at least comprises a first angle and a second angle, the second angle is equal to the first angle plus 180 degrees, and the first angle is not 0 degrees;

calculating the first loss according to the image features of two sample images whose direction information differs by 180 degrees in the same group of sample images comprises:
  calculating the first loss according to a difference between an image feature obtained by rotating an image feature of a sample image whose direction information is the first angle by 180 degrees and an image feature of a sample image whose direction information is the second angle in the same group of sample images.

5. The method according to claim 2, wherein obtaining the unlabeled first sample image comprises:
  obtaining an original image, wherein the original image comprises at least one of a synthetic image and a real image;
  performing a preprocessing on the original image to obtain a sample image meeting a model training requirement;
  performing a random data augmentation on the sample image to obtain the first sample image.

6. The method according to claim 3, wherein obtaining the unlabeled first sample image comprises:
  obtaining an original image, wherein the original image comprises at least one of a synthetic image and a real image;
  performing a preprocessing on the original image to obtain a sample image meeting a model training requirement;
  performing a random data augmentation on the sample image to obtain the first sample image.

7. The method according to claim 4, wherein obtaining the unlabeled first sample image comprises:
  obtaining an original image, wherein the original image comprises at least one of a synthetic image and a real image;
  performing a preprocessing on the original image to obtain a sample image meeting a model training requirement;
  performing a random data augmentation on the sample image to obtain the first sample image.

8. The method according to claim 5, wherein if the vision model is applied to a text recognition scenario, performing the preprocessing on the original image to obtain the sample image meeting the model training requirement comprises:
  performing a text detection on the original image, and extracting an image of a region where text information is located; and
  performing an image correction on the image of the region where the text information is located to obtain the sample image meeting the model training requirement.

9. The method according to claim 6, wherein if the vision model is applied to a text recognition scenario, performing the preprocessing on the original image to obtain the sample image meeting the model training requirement comprises:
  performing a text detection on the original image, and extracting an image of a region where text information is located; and
  performing an image correction on the image of the region where the text information is located to obtain the sample image meeting the model training requirement.

10. The method according to claim 7, wherein if the vision model is applied to a text recognition scenario, performing the preprocessing on the original image to obtain the sample image meeting the model training requirement comprises:
  performing a text detection on the original image, and extracting an image of a region where text information is located; and
  performing an image correction on the image of the region where the text information is located to obtain the sample image meeting the model training requirement.

11. The method according to claim 1, wherein adjusting the weight of the backbone network of the image classification network according to the first loss and the second loss comprises:
  calculating a sum of the first loss and the second loss as a final loss; and
  adjusting the weight of the backbone network of the image classification network according to the final loss.

12. The method according to claim 2, wherein adjusting the weight of the backbone network of the image classification network according to the first loss and the second loss comprises:
  calculating a sum of the first loss and the second loss as a final loss; and
  adjusting the weight of the backbone network of the image classification network according to the final loss.

13. The method according to claim 3, wherein adjusting the weight of the backbone network of the image classification network according to the first loss and the second loss comprises:
  calculating a sum of the first loss and the second loss as a final loss; and
  adjusting the weight of the backbone network of the image classification network according to the final loss.

14. The method according to claim 4, wherein adjusting the weight of the backbone network of the image classification network according to the first loss and the second loss comprises:
  calculating a sum of the first loss and the second loss as a final loss; and
  adjusting the weight of the backbone network of the image classification network according to the final loss.

15. The method according to claim 5, wherein adjusting the weight of the backbone network of the image classification network according to the first loss and the second loss comprises:
  calculating a sum of the first loss and the second loss as a final loss; and
  adjusting the weight of the backbone network of the image classification network according to the final loss.

16. The method according to claim 6, wherein adjusting the weight of the backbone network of the image classification network according to the first loss and the second loss comprises:
  calculating a sum of the first loss and the second loss as a final loss; and
  adjusting the weight of the backbone network of the image classification network according to the final loss.

17. A vision processing method, comprising:
  obtaining an image to be processed;
  inputting the image to be processed into a vision model, and performing a computer vision processing on the image to be processed through the vision model to obtain a processing result, wherein the vision model is trained by the method according to claim 1; and
  outputting the processing result.

18. An electronic device comprising:
  at least one processor; and
  a memory communicatively connected to the at least one processor; wherein, the memory stores instructions executable by the at least one processor, and the instructions are executed by the at least one processor to enable the at least one processor to:

establish an image classification network, wherein the image classification network has the same backbone network as a vision model;

perform a self-monitoring training on the image classification network by using an unlabeled first data set to obtain a trained image classification network;

initialize a weight of the backbone network of the vision model according to a weight of the backbone network of the trained image classification network to obtain a pre-training model;

train the pre-training model by using a labeled second data set to obtain a trained vision model; and apply the trained vision model to a computer vision task to perform a corresponding computer vision processing to obtain a processing result, wherein the computer vision task comprises target detection, image segmentation, and text recognition, and wherein performing the self-monitoring training on the image classification network by using the unlabeled first data set to obtain the trained image classification network comprises:

obtaining the unlabeled first data set, the first data set comprising a plurality of groups of sample images and direction information of each sample image, wherein each group of sample images comprises a first sample image and a second sample image obtained by rotating the first sample image by a preset angle;

extracting an image feature of each sample image in the first data set through the image classification network, and determining a direction prediction result of each sample image according to the image feature;

calculating a first loss according to the image features of two sample images whose direction information differs by 180 degrees in the same group of sample images; and calculating a second loss according to real direction information and the direction prediction result of each sample image; and adjusting the weight of the backbone network of the image classification network according to the first loss and the second loss.

19. A non-transitory computer-readable storage medium storing computer instructions, wherein the computer instructions are used to cause a computer to:

establish an image classification network, wherein the image classification network has the same backbone network as a vision model;

perform a self-monitoring training on the image classification network by using an unlabeled first data set to obtain a trained image classification network;

initialize a weight of the backbone network of the vision model according to a weight of the backbone network of the trained image classification network to obtain a pre-training model;

train the pre-training model by using a labeled second data set to obtain a trained vision model; and apply the trained vision model to a computer vision task to perform a corresponding computer vision processing to obtain a processing result, wherein the computer vision task comprises target detection, image segmentation, and text recognition, and wherein performing the self-monitoring training on the image classification network by using the unlabeled first data set to obtain the trained image classification network comprises:

obtaining the unlabeled first data set, the first data set comprising a plurality of groups of sample images and direction information of each sample image, wherein each group of sample images comprises a first sample image and a second sample image obtained by rotating the first sample image by a preset angle;

extracting an image feature of each sample image in the first data set through the image classification network, and determining a direction prediction result of each sample image according to the image feature;

calculating a first loss according to the image features of two sample images whose direction information differs by 180 degrees in the same group of sample images; and calculating a second loss according to real direction information and the direction prediction result of each sample image; and adjusting the weight of the backbone network of the image classification network according to the first loss and the second loss.

* * * * *